United States Patent [19]

Bienert et al.

[11] Patent Number: 5,020,850
[45] Date of Patent: Jun. 4, 1991

[54] ROOF AND FRAME ASSEMBLY FOR A MOTOR VEHICLE AND METHOD OF FORMING SAME

[75] Inventors: Horst Bienert, Gauting; August Hirschberger; Bernd Schleicher, both of Muenchen; Richard Igel, Germering; Kurt Meier, Oberdolling, all of Fed. Rep. of Germany

[73] Assignee: Webasto AG Fahrzeugtechnik, Fed. Rep. of Germany

[21] Appl. No.: 410,893

[22] Filed: Sep. 22, 1989

[30] Foreign Application Priority Data

Sep. 27, 1989 [DE] Fed. Rep. of Germany ....... 3832681

[51] Int. Cl.$^5$ ............................................. B60J 7/057
[52] U.S. Cl. ......................... 296/223; 49/352; 49/360; 74/89.17; 74/89.2; 74/502.4
[58] Field of Search ................ 296/223; 49/352, 360; 74/89.17, 89.2, 502.4

[56] References Cited

U.S. PATENT DOCUMENTS

| 3,235,248 | 2/1966 | Golde | 49/352 |
|---|---|---|---|
| 3,280,509 | 10/1966 | Werner | 49/352 |
| 3,675,371 | 7/1972 | Golde et al. | 49/352 |
| 4,162,805 | 7/1979 | Hirschberger | 296/223 |
| 4,272,125 | 6/1981 | Bienert et al. | 296/223 |
| 4,390,203 | 6/1983 | Lutz et al. | 296/223 |
| 4,567,692 | 2/1986 | Vogt et al. | 296/223 X |
| 4,614,009 | 9/1986 | Boots | 296/223 X |
| 4,659,140 | 4/1987 | Fuerst et al. | 296/223 |
| 4,727,681 | 3/1988 | Kinoshita et al. | 49/352 |
| 4,749,227 | 6/1988 | Bienert et al. | 296/221 |

FOREIGN PATENT DOCUMENTS

| 623786 | 7/1961 | Canada | 296/223 |
|---|---|---|---|
| 653922 | 12/1962 | Canada | 296/223 |
| 3708635 | 9/1987 | Fed. Rep. of Germany | 296/223 |
| 2016642 | 9/1979 | United Kingdom | 74/89.17 |

*Primary Examiner*—Dennis H. Pedder
*Attorney, Agent, or Firm*—Sixbey, Friedman, Leedom & Ferguson

[57] ABSTRACT

A sliding type vehicle roof is provided having guide tubes for pressure-resistant drive cables that are positioned, in the zone of contact area between the drive cables and a drive device, in a sheathing part that is formed about the guide tubes and acts as a holding device for the guide tubes. In the sheathing part, there is provided at least one recess to accommodate a drive pinion of the drive device, and a central opening in the base of the recess for accurately locating the drive pinion. Further, the sheathing part functions as a support for the drive device, that is suitably attached to the sheathing part with the aid of screws, and a defined seat can be provided on the sheathing part to receive the top housing part of the drive device. The sheathing part with the drive thereon can be attached to the frame, which can be set into a roof opening of a vehicle roof.

14 Claims, 3 Drawing Sheets

ROOF AND FRAME ASSEMBLY FOR A MOTOR VEHICLE AND METHOD OF FORMING SAME

BACKGROUND OF THE INVENTION

1. Technical Field

This invention relates to a vehicle roof of the sliding and/or lifting roof type used in motor vehicles that includes a frame that is set into a roof opening of a fixed roof surface, and a cover movably mounted to the frame by which the roof opening can be closed. More particularly, the cover can be moved by pressure-resistant drive cables that are driven from a drive device, wherein a drive pinion of the drive device operates on the drive cables in a zone of contact of the drive device with the pressure-resistant drive cables, and the drive cables are located in the zone of contact by guide tubes that are held on the frame by a holding device.

2. Description of Related Art

In known vehicle roofs of the type that can be actuated by a hand crank drive device or an electrical drive device, it has thus far been the practice to provide guide tubes near the middle of the front edge of the frame opening that are used for guiding pressure-resistant drive cables in the zone of contact of the drive cables with a drive pinion of the drive device. Such guide tubes are attached to the frame with the aid of a holding plate. The holding plate has recesses into which the respective ends of the guide tubes can be set, and the guide tubes are subsequently solidly connected to the holding plate, for example by soldered joints. The guide tubes do not extend into the zone of contact of the pressure-resistant drive cables and the drive pinion, but rather the drive cables are guided in this zone directly by way of a guide part that is separately connected with the holding plate so that the teeth of the drive pinion reliably mesh with and drive the pressure-resistant drive cables.

Thus, with the known devices, disadvantageously, in order to accurately match the many individual parts that must be assembled together as a result of not extending the guide tubes within the zone of contact to provide the required access to the drive cables by the drive pinion, the expense of assembly from a production engineering standpoint is greatly increased. This is because not only are both guide tubes for the drive cables set into the holding plate, but also two outlet tubes for receiving the exposed ends of the drive cables are connected to the holding plate. Thus, four tube parts must be attached to the holding plate, for example by brazing. Moreover, between the zone of contact and the guide tubes, alignment errors can occur on the holding part, so that at these transition points noise generated as a result of the roof actuation is unavoidable. Furthermore, the orientation and centering of a drive device for imparting movement to the pressure-resistant drive cables is complicated and expensive, since the drive parts and the pressure-resistant drive cables are attached at various levels. It is also optionally known to further include threaded bushings that are also required for connecting additional guide tube parts.

SUMMARY OF THE INVENTION

Therefore, primary objects of the present invention are to overcome the difficulties described above and to provide a vehicle roof of the generic type wherein the guide tubes for the pressure-resistant drive cables are more simply held in the zone of contact of the drive device so as to achieve a quiet actuation of the roof and thus a smooth operation of the drive device, and the assembly of guide tubes and other devices is simplified overall.

In order to achieve these objects, a vehicle roof is constructed in accordance with the present invention with a frame that is set into a roof opening and a cover that can be moved by pressure-resistant drive cables from a drive device. A drive pinion of the drive device operates in a zone of contact with the pressure-resistant drive cables to drive both of the drive cables together that are placed in this zone by way of guide tubes that are held on the frame by a holding device. The present invention is distinguished from the known prior art type roofs in that the holding device is formed by a sheathing part that is fixed around the guide tubes, and the sheathing part is provided with a recess so as to accommodate the drive pinion of the drive device.

Thus, in the vehicle roof according to the present invention, the holding device is fixedly provided around the guide tubes so that, in one operation, the guide tubes are immobilized in the sheathing part. In this way, the assembly steps can be reduced considerably, so that an economically more favorable assembly is achieved. In a sheathing part provided this way, the zone of contact of the drive pinion and the pressure-resistant drive cables that run in the guide tubes is simultaneously provided by way of a recess made in the sheathing part for the drive pinion. This recess is preferably machined into the sheathing part mechanically, for example by milling, so that, in the zone of contact of the drive pinion and the drive cables, the drive cables are exposed. Additionally, the assigned guide tubes are cut out in a suitable way. Since the sheathing part advantageously also provides the access to the drive cables for the drive pinion, additional guide parts for the drive cables as well as for the drive pinion can be eliminated in the zone of contact of the drive pinion and the drive cables. The result is that the overall total number of components to be assembled is considerably reduced, and in particular, associated alignment errors and the like can be effectively avoided. Transition points between the zone of contact and the guide tubes also are eliminated, so that a considerable noise reduction is also advantageously achieved.

According to a preferred embodiment made in accordance with the present invention, two recesses are provided as alternative locations in the sheathing part for the drive pinion at a spaced distance from one another. In doing so, a simplification from a production engineering viewpoint is achieved to the effect that, with one sheathing part, various differently attached drive devices can be designed for and utilized with the assembly. For example, in electrical drives, the drive pinion is provided at a different location than with a hand crank drive device. In this way, special advantages are achieved with respect to mass production of such a holding device for guide tubes in a vehicle roof.

Suitably, the recess or recesses also act as a centering device for the drive pinion in their base, so that, after installation in the sheathing part, the drive pinion is precisely aligned and centered with respect to the drive cables in the guide tubes. In doing so, the time-consuming alignment work that was necessary in previously known assemblies between the drive pinion and the drive cables can be avoided.

According to another advantageous embodiment, the sheathing part simultaneously also functions as a support for the drive device by including attachment elements for the drive device that can be formed on the sheathing part. Such attachment elements are preferably made as tapped openings in the sheathing part. This standardizes the attachment levels of the drive device and guide tubes or drive cables, so that alignment errors that are common in the previously known assemblies and the necessary adjustments associated therewith can be eliminated. Furthermore, yet another function is combined in such a sheathing part, namely, as a support for the drive device.

Preferably, according to the invention, the sheathing part can be attached onto the frame that is set into the roof opening, so that the frame can be produced at the manufacturer together with the drive device and parts associated with the drive device as a unit that can be preassembled.

Depending on the necessary rigidity of the sheathing part as a holding device for the guide tubes, the sheathing part can be made of die cast metal or plastic. Preferably, a die cast metal is used, and in particular, a zinc die cast metal is used since it is corrosion-resistant.

These and other objects, features, and advantages of the present invention will become more apparent from the following description when taken in conjunction with the accompanying drawings which show, for purposes of illustration only, plural embodiments in accordance with the present invention.

DETAILED DESCRIPTION OF THE PREFERRED EMBODIMENTS

Figure 1:
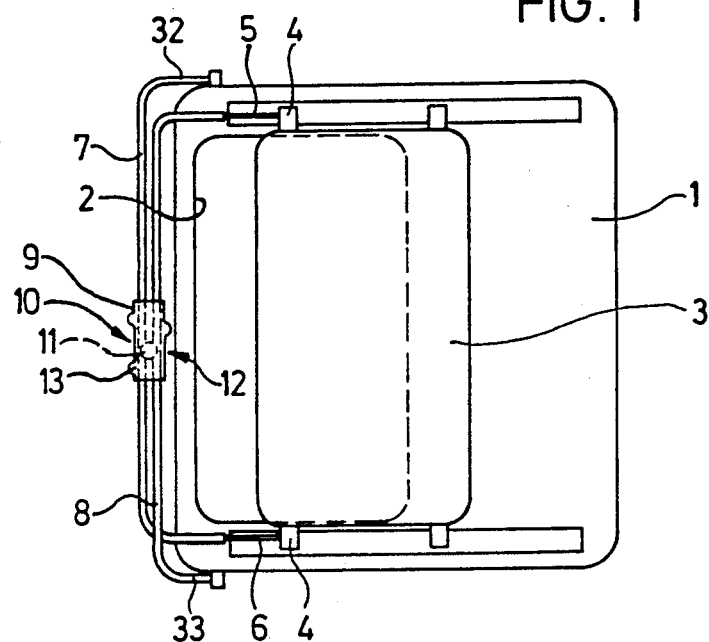
FIG. 1 is a diagrammatic top view of a vehicle roof made according to the present invention.

Referring now to the several figures and in particular to FIG. 1, a frame 1 is diagrammatically illustrated that can be set into a roof opening, not represented in more detail, of a fixed roof surface of a vehicle. Frame 1 delimits a frame opening 2 that can be opened and closed by a cover 3. Cover 3 is provided with sliders 4 on the edges of its longitudinal sides that are connected to the ends of pressure-resistant drive cables 5 and 6. Near the middle of the front edge of frame opening 2, drive cables 5 and 6 are guided in guide tubes 7 and 8 that are attached to frame 1 by a holding device 9. A drive device 10, which can be made, for example, of a hand crank drive or an electric motor drive, has a drive pinion 11 provided in a zone of contact 12 so as to operatively drive both of the drive cables 5 and 6 in the area of the holding device 9.

Figure 3:
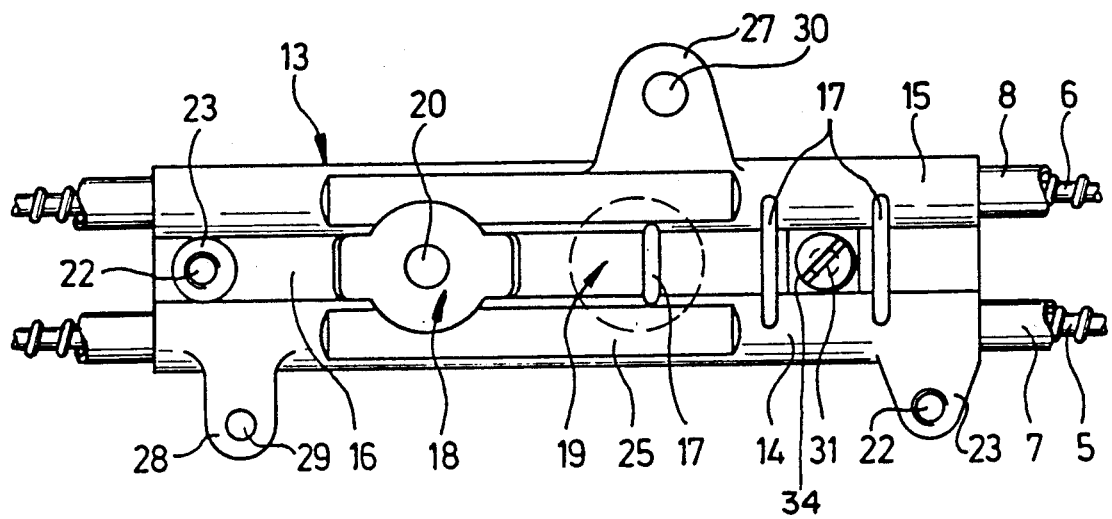
FIG. 3 is a bottom view of a holding device for the guide tubes formed in accordance with the present invention.
Figure 4:
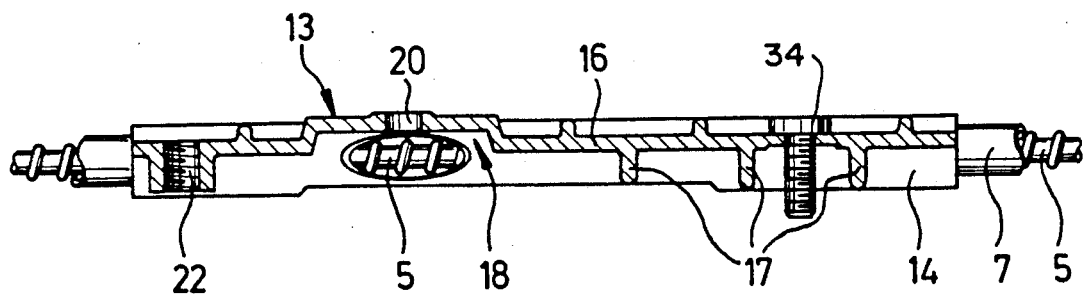
FIG. 4 is a longitudinal cross-sectional view of the holding device shown in FIG. 3.
Figure 5:
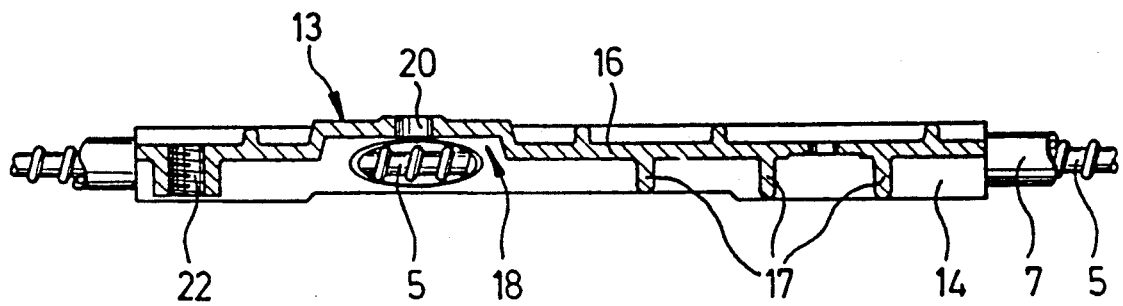
FIG. 5 is a view corresponding to FIG. 4 illustrating an embodiment formed of plastic material.

As can be seen from FIGS. 3 and 4, the holding device 9 includes a sheathing part, designated overall by 13, that is formed (such as by die casting of metal or injection molding of plastic) directly around guide tubes 7 and 8, which are of a continuous form in their basic state, i.e., as made, for example, of die cast metal or plastic. Thus, the guide tubes 7 and 8 are reliably fixed in the sheathing part 13, and the positional relationship of the guide tubes 7 and 8 with respect to one another is also fixed. As can further be seen from FIG. 3 and 4 and when viewed together, the sheathing part 13 has two sections 14 and 15 that surround the guide tubes 7 and 8 respectively, wherein the sheathing parts 14 and 15 are connected together by an interposed continuous web section 16. For reinforcement, crosswise ribs 17 can be integrally formed with the sheathing part 13 in the area of web section 16.

Figure 2:
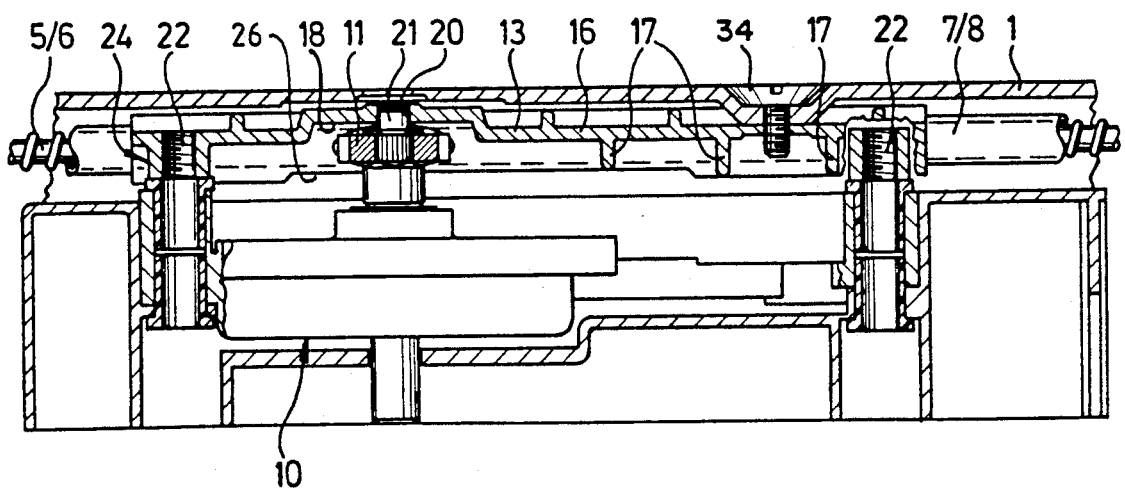
FIG. 2 is a cut-out sectional view of the area near the middle of the front edge of the frame of FIG. 1, illustrating the interaction of a drive device and pressure-resistant drive cables in the zone of contact of both.

In the embodiment represented in FIGS. 1–4, a recess 18 is provided, that is located off-center in the lengthwise direction of the sheathing part 13, so as to accommodate a drive pinion 11, shown in FIGS. 1 and 2, of a drive device 10. As represented in a dashed line in FIG. 3, at a spaced distance from the recess 18, there can be provided another approximately centrally placed recess 19, in which a drive pinion 11 may alternately be positioned. The off-center placement of recess 18 is intended, for example, for an electric motor drive, while a centrally placed recess 19 can be utilized for a mechanical hand crank drive device.

These recesses 18 and 19 are preferably produced mechanically, for example by milling, after production of the sheathing part 13. Recesses 18 and 19 have a depth that is sufficient to accommodate the guide tubes 7 and 8, and a portion of guide tubes 7 and 8 and of sheathing sections 14 and 15 are cut out together within the recess in the zone of contact 12, so that in this zone of contact 12, the drive cables 5 and 6 are exposed for drivingly meshing with the drive pinion 11.

In operation, the drive pinion 11 is set into one of the respective recesses 18 and 19 so as to move the cover 3 by drive cables 5 and 6. In the base of the recess 18 or 19 a central opening 20 is formed as shown in FIG. 2, into which a journal 21 of the drive pinion 11 is positioned. Thereby, the drive pinion 11 is centered on recess 18 or 19 in true alignment with the drive cables 5 and 6, running in guide tubes 7 and 8 in the zone of contact 12, without the need for additional stopping or guide devices in the zone of contact 12.

As illustrated in FIGS. 2–4, the sheathing part 13 includes attachment elements formed as lugs 23 having tapped openings 22. The openings 22 may be threaded to cooperate with a bolt or screw, or may be made to accommodate self-tapping screws 34 therein. The attachment elements are designated overall by 24 and serve to provide means for attaching the drive device 10 to the sheathing part 13. Optionally, the part of sheathing part 13 that faces the drive device 10, as shown by 25 in FIG. 3, can be machined flat to form an indentation 26, see FIG. 2, so as to be able to receive therein a control gear of drive device 10, not shown in more detail. The sheathing part 13, thus, functions, simultaneously, as a support for the drive device 10 and provides a defined contact surface for ensuring a reliable interaction of the drive pinion 11 and the drive cables 5 and 6 in the zone of contact 12 on the sheathing part 13.

Furthermore, the sheathing part 13 may form a connection part for interconnection between frame 1 and the fixed vehicle roof. As shown in FIG. 3, the sheathing part 13 may include two attachment flanges 27 and 28 in which openings 29 and 30 are provided, and yet another opening 31 can be provided in the web section 16. These openings 29, 30 and 31 serve the purpose of attaching the sheathing part 13 to the frame 1 and attaching the frame 1 to the fixed vehicle roof i.e., due to the provision of flanges 27 and 28 with openings 29 and 30. See FIG. 3.

As illustrated by the preceding embodiments, the holding device 9, in the vehicle roof according to the invention, is made as a sheathing part 13 for surrounding and securing the guide tubes 7 and 8. In each case, parts of the guide tubes 7 and 8, shown in FIG. 1, can be designed as outlet tubes that extend from the sheathing part 13 for receiving the exposed ends of the drive cables 5 and 6. The other ends 32 and 33 of the outlet tube sections are preferably closed on their ends, for example by being pressed together. Thus, the sheathing part 13 formed in accordance with the present invention fulfills several objects here. On the one hand, the sheathing part 13 functions as a holding device 9 for the guide tubes 7 and 8, and on the other hand, as an access opening for the drive pinion 11 so as to operatively drive the drive cables 5 and 6, in the zone of contact 12 of a drive device 10. Moreover, the sheathing part functions as a centering device for the drive pinion 11 by the central opening 20 and as a support for the drive device 10 with a defined seat in area 25. Finally, attachment elements are also advantageously preferably provided for attaching the sheathing part 13 to the frame 1.

Thus, not only is the production of such a holding device simplified, but even more importantly, the overall expense of assembly is reduced by the manner of the combination of the drive device 10 and the drive cables 5 and 6, since previously necessary additional guide and centering parts are eliminated. Moreover, the additional steps that were previously required for aligning and adjusting the assembly are no longer necessary. Additionally, with the design according to the invention, no transition areas are present between the guide tubes 7 and 8, which is especially beneficial in the zone of contact 12, so that a quieter functioning of drive device 10 in combination with the drive cables 5 and 6 is achieved.

Of course, the invention is not intended to be limited to the embodiments shown and described above, and it is contemplated that numerous changes and modifications are possible that would be apparent to one of ordinary skill in the art without leaving the scope of the invention. Thus, for example, the number and position of recesses 18 and 19 can be different from that of the described embodiments depending on the type of the respective drive device and its design. This invention is equally applicable to sliding type vehicle roofs or sliding-lifting type vehicle roofs. As such, the invention is intended to extend to the full scope of the appended claims.

We claim:

1. A vehicle roof assembly having a frame for setting within an opening of a fixed vehicle roof and a cover movably mounted to said frame, comprising:
   pressure-resistant drive cables connected between said cover and a drive means, said drive means including a drive pinion, and a holding means for fixedly locating guide tubes through which said pressure-resistant drive cables are driven at a zone of contact of said drive pinion and said pressure-resistant drive cables, said holding means comprising a sheathing part that is molded around said guide tubes, and wherein said sheathing part further includes a recess formed therein for accommodating said drive pinion therein, said guide tubes running completely through said sheathing part and an opening being formed in a portion of the guide tube and the sheathing part adjacent said recess to expose said drive cables from within said recess in said zone of contact.

2. Vehicle roof according to claim 1, wherein said recess for positioning said drive pinion is mechanically machined into said sheathing part by milling.

3. The vehicle roof according to claim 1, wherein two recesses are provided at a distance from one another to provide alternate selective positions for reception of said drive pinion, wherein said recesses are provided for accommodating different type drive means.

4. The vehicle roof of claim 3, wherein said recesses are each provided with a base having a central opening for receiving a journal of said drive pinion therein.

5. The vehicle roof according to claim 1, wherein said recess has a base with central opening for receiving a journal of said drive pinion therein.

6. The vehicle roof according to claim 1, wherein said sheathing part includes means for supporting said drive means.

7. The vehicle roof according to claim 6, wherein attachment elements are formed on said sheathing part for connection to said drive means.

8. The vehicle roof according to claim 7, wherein said attachment elements have screw couplings.

9. The vehicle roof according to claim 8, wherein said screw couplings are partially self-tapping devices.

10. The vehicle roof according to claim 1, wherein said sheathing part is attached to said frame.

11. The vehicle roof according to claim 1, wherein said sheathing part consists of die cast metal.

12. The vehicle roof according to claim 1, wherein said sheathing part consists of injection molded plastic.

13. The vehicle roof according to claim 1, wherein said sheathing part forms a connection part for interconnecting said frame to the fixed vehicle roof.

14. The vehicle roof according to claim 13, wherein said connection part comprises attachment flanges for connecting to said frame and the fixed vehicle roof that are formed on said sheathing part.

* * * * *